(12) United States Patent
Hoshiya et al.

(10) Patent No.: US 9,662,958 B2
(45) Date of Patent: May 30, 2017

(54) WORK VEHICLE

(71) Applicant: KOMATSU LTD., Tokyo (JP)

(72) Inventors: Masahiko Hoshiya, Hiratsuka (JP);
Youichi Hayashi, Hiratsuka (JP);
Yuusuke Igarashi, Hirakata (JP);
Shunsuke Yoshioka, Hirakata (JP)

(73) Assignee: KOMATSU LTD., Tokyo (JP)

( * ) Notice: Subject to any disclaimer, the term of this patent is extended or adjusted under 35 U.S.C. 154(b) by 287 days.

(21) Appl. No.: 14/376,642

(22) PCT Filed: May 14, 2014

(86) PCT No.: PCT/JP2014/062838
§ 371 (c)(1),
(2) Date: Aug. 5, 2014

(87) PCT Pub. No.: WO2014/192545
PCT Pub. Date: Dec. 4, 2014

(65) Prior Publication Data
US 2016/0229261 A1      Aug. 11, 2016

(51) Int. Cl.
*B60H 1/00*      (2006.01)
*B60H 1/32*      (2006.01)
(Continued)

(52) U.S. Cl.
CPC ..... *B60H 1/00378* (2013.01); *B60H 1/00642* (2013.01); *B60H 1/00828* (2013.01);
(Continued)

(58) Field of Classification Search
CPC .... B60H 1/005; B60H 1/3205; B60H 1/3222; B60H 1/00378; B60H 1/3211
See application file for complete search history.

(56) References Cited

U.S. PATENT DOCUMENTS 5,947,248 A * 9/1999 Link .................... B60H 1/3222
  192/84.1
6,330,909 B1 * 12/2001 Takahashi .............. B60H 1/005
  165/202

(Continued)

FOREIGN PATENT DOCUMENTS

| CN | 1701166 A | 11/2005 |
|---|---|---|
| CN | 103074914 A | 5/2013 |

(Continued)

*Primary Examiner* — Hau Phan
(74) *Attorney, Agent, or Firm* — Drinker Biddle & Reath LLP

(57) ABSTRACT

A work vehicle includes a condenser, a fan, a variable mechanism, a fan control unit, an outside air temperature sensor, and a storage unit. The condenser cools a cooling medium used in an air conditioner. The fan cools the condenser. The variable mechanism can change a number of rotations of the fan. The fan control unit controls the variable mechanism. The storage unit stores a plurality of control maps for setting the number of rotations of the fan to respective different numbers of rotations of the fan in accordance with the outside air temperature detected by the outside air temperature sensor. The fan control unit controls the variable mechanism in accordance with one control map selected from the plurality of control maps stored in the storage unit based on an operating state of the air conditioner, to control the number of rotations of the fan.

7 Claims, 10 Drawing Sheets

(51) Int. Cl.
 *B60K 11/02* (2006.01)
 *E02F 9/08* (2006.01)
 *E02F 9/16* (2006.01)
 *F01P 7/04* (2006.01)
 *E02F 3/32* (2006.01)

(52) U.S. Cl.
 CPC ............ *B60H 1/3211* (2013.01); *B60K 11/02* (2013.01); *E02F 9/0866* (2013.01); *E02F 9/16* (2013.01); *B60H 2001/3266* (2013.01); *B60H 2001/3277* (2013.01); *E02F 3/32* (2013.01); *F01P 7/04* (2013.01)

(56) References Cited

U.S. PATENT DOCUMENTS

| | | | | |
|---|---|---|---|---|
| 6,823,681 | B2 * | 11/2004 | Hirose | B60H 1/3205 62/133 |
| 2003/0084673 | A1 | 5/2003 | Moon et al. | |
| 2003/0233839 | A1 * | 12/2003 | Hirose | B60H 1/3205 62/186 |
| 2005/0124461 | A1 | 6/2005 | Inoue et al. | |
| 2005/0178132 | A1 * | 8/2005 | Sakaguchi | B60H 1/3205 62/181 |
| 2006/0062678 | A1 | 3/2006 | Furuta et al. | |
| 2011/0105005 | A1 * | 5/2011 | Spaggiari | B60H 1/00828 454/75 |
| 2012/0263593 | A1 * | 10/2012 | McCallum | F04D 29/362 416/147 |
| 2014/0060099 | A1 | 3/2014 | Kitaoka et al. | |

FOREIGN PATENT DOCUMENTS

| | | |
|---|---|---|
| CN | 103511054 A | 1/2014 |
| JP | H4-190050 A | 7/1992 |
| JP | H05-149636 A | 6/1993 |
| JP | H5-280795 A | 10/1993 |
| JP | H5-286354 A | 11/1993 |
| JP | H09-195767 A | 7/1997 |
| JP | 2003-011657 A | 1/2003 |
| JP | 2003-0084673 | 12/2003 |
| JP | 2004-293901 A | 10/2004 |
| JP | 2004-353554 A | 12/2004 |
| JP | 2005-003131 A | 1/2005 |
| JP | 2007-106289 A | 4/2007 |
| JP | 2008-019589 A | 1/2008 |
| JP | 2012-144231 A | 8/2012 |
| JP | 2013-047470 A | 3/2013 |
| JP | 2014-043227 A | 3/2014 |
| WO | WO 2014/006771 A1 | 1/2014 |

* cited by examiner

FIG.2
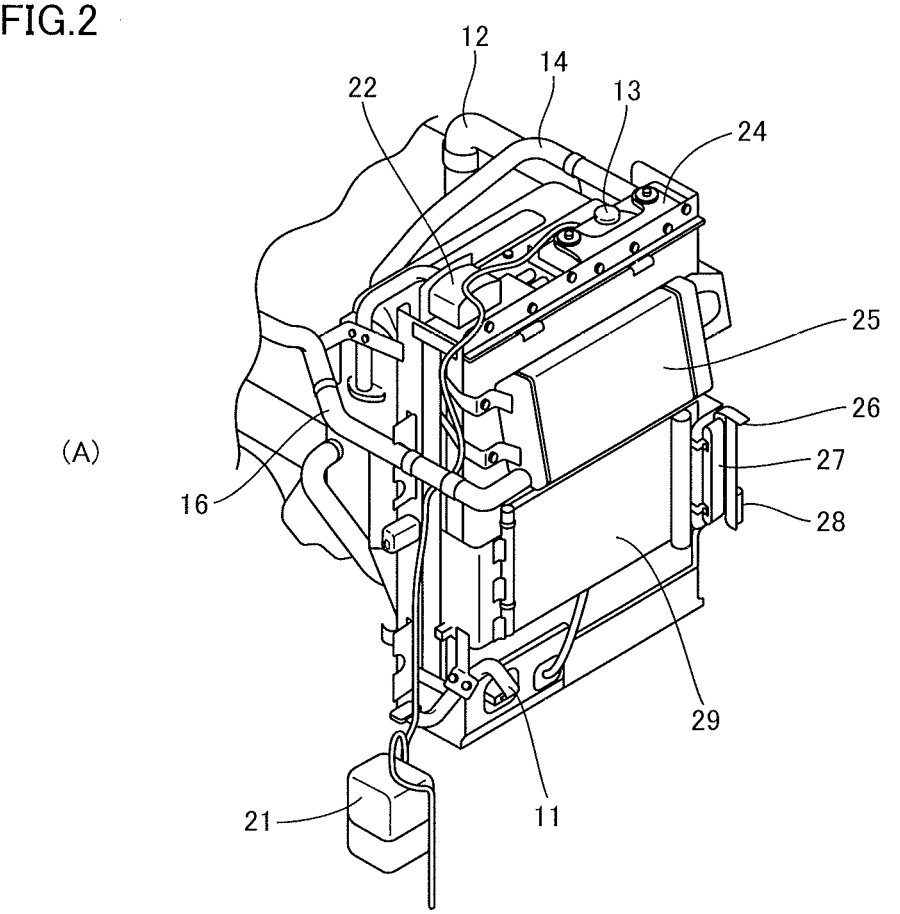
(A)
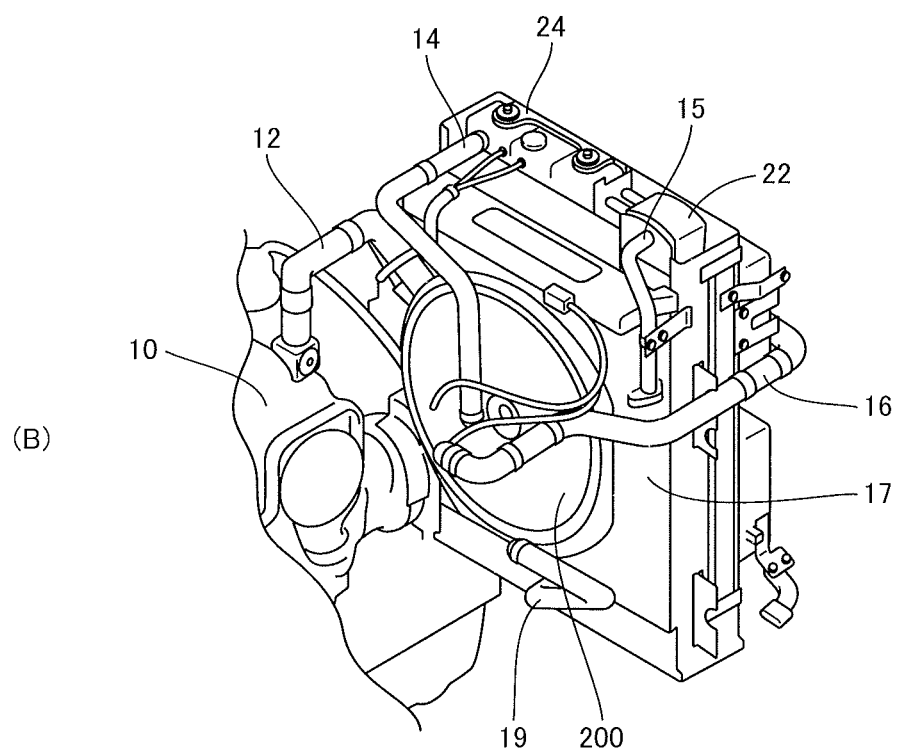
(B)

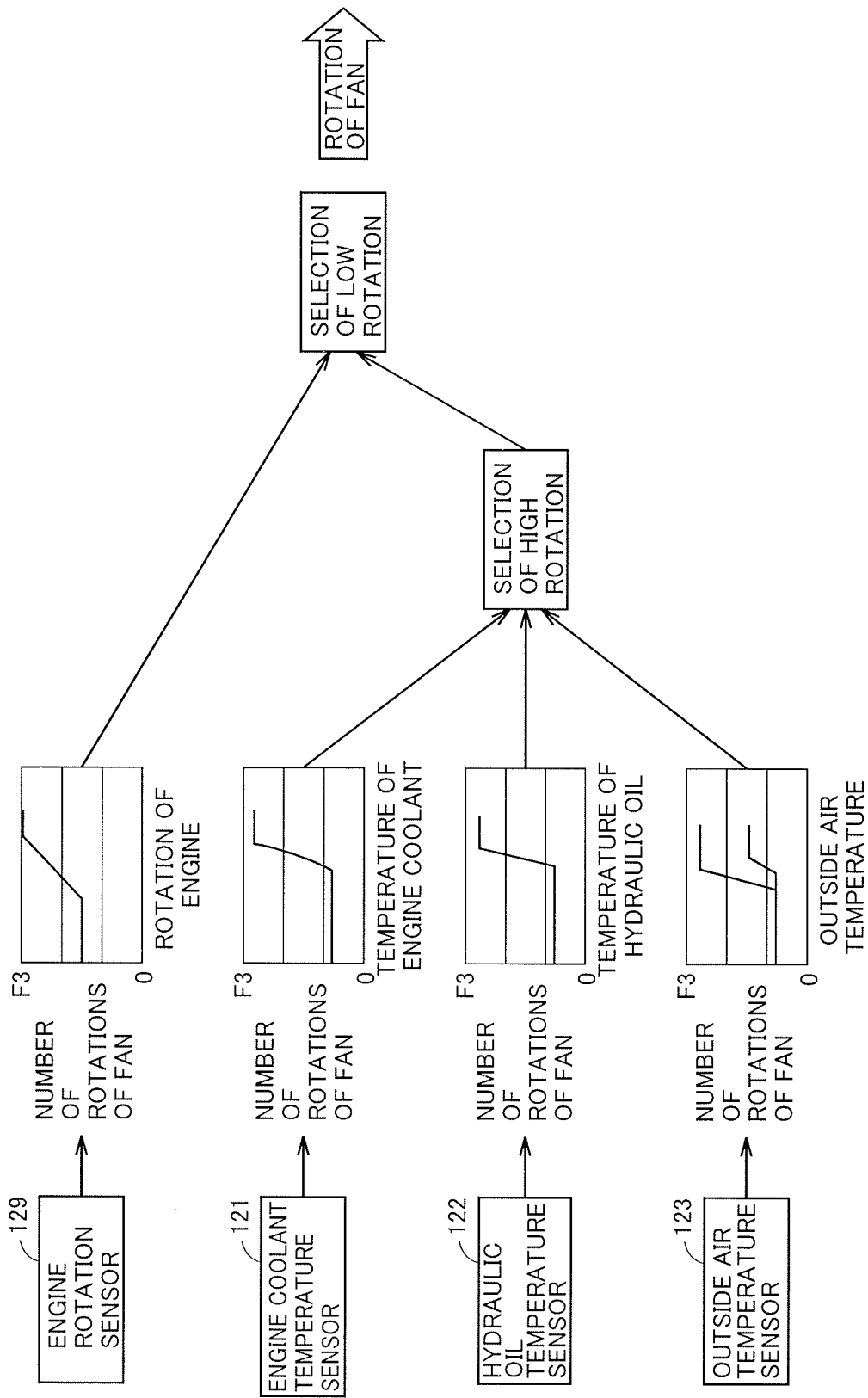

WORK VEHICLE

TECHNICAL FIELD

The present invention relates to a work vehicle.

BACKGROUND ART

Generally, a cooling fan is coupled to an engine of a work vehicle. For example, PTD 1 discloses a fan coupled to an output shaft of an engine via a clutch (fan clutch). The fan clutch can adjust the number of rotations of the fan.

PTD 1 discloses a scheme for controlling connection/disconnection of the fan clutch by setting a threshold value for determining whether or not the temperature of a cooling object, for example an engine coolant or the like, is within a predetermined temperature range, and performing control based on whether or not the threshold value is exceeded, for the control of the number of rotations of the fan.

PTD 2 discloses a scheme for controlling a fan clutch by estimating an operation state of a vehicle and using a control map for adjusting the number of rotations of a fan corresponding to the estimated operation state, for the control of the fan clutch.

CITATION LIST

Patent Document

PTD 1: Japanese Patent Laying-Open No. 2005-3131
PTD 2: Japanese Patent Laying-Open No. 2013-47470

SUMMARY OF INVENTION

Technical Problem

On the other hand, it is desirable for an operator to operate a work vehicle in a comfortable working environment, and it is needed to appropriately control an air conditioner within an operator's cab. The work vehicle is provided with a condenser for an air conditioner as a cooling object, and the condenser should be cooled by rotating a fan. However, PTD 1 and PTD 2 described above do not disclose efficiently adjusting the number of rotations of the fan to cool the condenser.

The present invention has been made to solve the aforementioned problem, and one object of the present invention is to provide a work vehicle capable of efficiently controlling the number of rotations of a fan based on an operating state of an air conditioner.

Other tasks and novel features will become apparent from the description herein and the attached drawings.

Solution to Problem

A work vehicle in accordance with an aspect of the present invention includes a condenser, a fan, a variable mechanism, a fan control unit, an outside air temperature sensor, and a storage unit. The condenser cools a cooling medium used in an air conditioner. The fan cools the condenser. The variable mechanism can change a number of rotations of the fan. The fan control unit controls the variable mechanism. The outside air temperature sensor detects an outside air temperature. The storage unit stores a plurality of control maps for setting the number of rotations of the fan to respective different numbers of rotations of the fan in accordance with the outside air temperature detected by the outside air temperature sensor. The fan control unit controls the variable mechanism in accordance with one control map selected from the plurality of control maps stored in the storage unit based on an operating state of the air conditioner, to control the number of rotations of the fan.

According to the work vehicle in the present invention, since one control map is selected from the plurality of control maps based on the operating state of the air conditioner to control the variable mechanism, the number of rotations of the fan can be efficiently adjusted.

Preferably, in one control map of the plurality of control maps, the number of rotations of the fan starts increasing at an outside air temperature lower than that in another control map.

According to the above, since the number of rotations of the fan starts increasing at a lower outside air temperature in the one control map, the number of rotations of the fan can be increased at an early point, and can be adjusted in accordance with the operating state of the air conditioner.

Preferably, in one control map of the plurality of control maps, a change rate of the number of rotations of the fan with respect to the outside air temperature is larger than that in another control map.

According to the above, since the change rate of the number of rotations of the fan is larger in the one control map, the number of rotations of the fan can be increased at an early point, and can be adjusted in accordance with the operating state of the air conditioner.

Preferably, the work vehicle further includes an engine for supplying a drive force for rotation to the fan. The variable mechanism is provided between the engine and the fan, and can change the number of rotations of the fan with respect to a number of rotations of the engine.

According to the above, since the number of rotations of the fan can be changed with respect to the number of rotations of the engine, fuel efficiency of the engine can be improved by appropriately adjusting the number of rotations of the fan.

Preferably, the fan further cools at least one of an engine coolant for cooling the engine and a hydraulic oil used in a work implement. The storage unit further stores at least one of an engine coolant temperature control map for setting the number of rotations of the fan in accordance with a temperature of the engine coolant and a hydraulic oil temperature control map for setting the number of rotations of the fan in accordance with a temperature of the hydraulic oil. The fan control unit controls the variable mechanism based on the selected control map and at least one of the engine coolant temperature control map and the hydraulic oil temperature control map, to adjust the number of rotations of the fan.

According to the above, since the number of rotations of the fan is adjusted also in consideration of at least one of the engine coolant temperature control map and the hydraulic oil temperature control map, the number of rotations of the fan can be appropriately adjusted in consideration of other cooling objects.

Preferably, the work vehicle further includes a compressor for compressing the cooling medium for the air conditioner. The fan control unit detects a state of an ON/OFF drive signal which controls an ON/OFF operation of the compressor. When the fan control unit detects that an ON operation by the ON/OFF drive signal continues for a first period, the fan control unit controls the variable mechanism in accordance with the other control map of the plurality of control maps, and when the fan control unit detects that the ON operation by the ON/OFF drive signal continues for a second period longer than the first period, the fan control unit controls the variable mechanism in accordance with the one control map of the plurality of control maps.

According to the above, when it is detected that a period of the ON operation of the ON/OFF drive signal continues for the second period longer than the first period, the variable mechanism is controlled in accordance with the one control map. Since the control maps are switched in accordance with the length of the period of the ON operation of the ON/OFF drive signal, the number of rotations of the fan can be appropriately adjusted in accordance with the state of a load on the air conditioner.

Preferably, in a case where the fan control unit controls the variable mechanism in accordance with the one control map of the plurality of control maps, when the fan control unit detects that an OFF operation by the ON/OFF drive signal continues for a third period, the fan control unit controls the variable mechanism in accordance with the other control map of the plurality of control maps, and when the fan control unit detects that the OFF operation by the ON/OFF drive signal continues for a fourth period longer than the third period, the fan control unit stops control of the variable mechanism in accordance with the other control map of the plurality of control maps.

According to the above, when it is detected that a period of the OFF operation of the ON/OFF drive signal continues for the fourth period longer than the third period, control of the variable mechanism in accordance with the other control map is stopped. Since the control in accordance with the control map is stopped in accordance with the length of the period of the OFF operation of the ON/OFF drive signal, the number of rotations of the fan can be appropriately adjusted in accordance with the state of a load on the air conditioner.

Advantageous Effects of Invention

The number of rotations of a fan can be efficiently controlled based on an operating state of an air conditioner.

BRIEF DESCRIPTION OF DRAWINGS

FIG. 2 shows perspective views showing a configuration of a cooling unit based on the embodiment.

FIG. 10 is a conceptual diagram for controlling fan 200 using a plurality of control maps.

DESCRIPTION OF EMBODIMENTS

An embodiment of the present invention will be described hereinafter with reference to the drawings.

<Overall Configuration>

Figure 1:
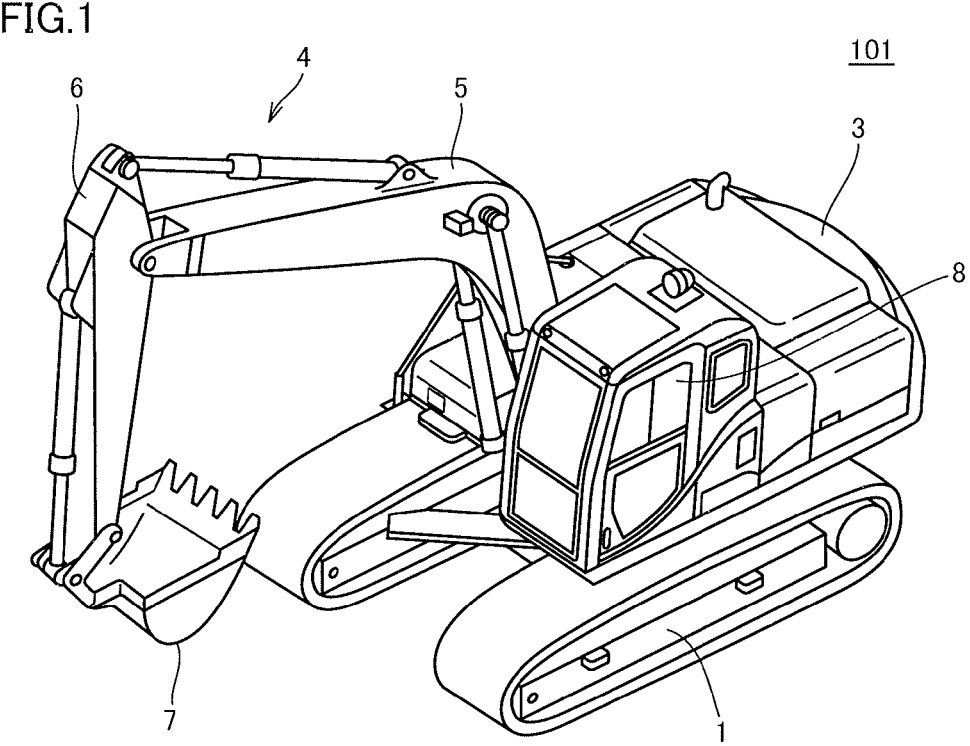
FIG. 1 is a diagram illustrating an appearance of a work vehicle 101 based on an embodiment.

FIG. 1 is a diagram illustrating an appearance of a work vehicle 101 based on an embodiment.

As shown in FIG. 1, in the present example, a hydraulic excavator will mainly be described by way of example as work vehicle 101 based on the embodiment.

Work vehicle 101 mainly includes a lower carrier 1, an upper revolving unit 3, and a work implement 4. A work vehicle main body is constituted of lower carrier 1 and upper revolving unit 3. Lower carrier 1 has a pair of left and right crawler belts. Upper revolving unit 3 is attached revolvably, with a revolving mechanism in an upper portion of lower carrier 1 being interposed.

Work implement 4 is pivotably supported by upper revolving unit 3 in a manner operable in a vertical direction, and performs such working as excavation of soil. Work implement 4 includes a boom 5, an arm 6, and a bucket 7. Boom 5 has a root portion movably coupled to upper revolving unit 3. Arm 6 is movably coupled to a tip end of boom 5. Bucket 7 is movably coupled to a tip end of arm 6. In addition, upper revolving unit 3 includes an operator's cab 8 in which cool wind cooled by an air conditioner is blown, and the like.

<Configuration of Cooling Unit>

FIG. 2 shows perspective views showing a configuration of a cooling unit based on the embodiment.

As shown in FIGS. 2(A) and 2(B), the cooling unit includes, as cooling objects, an oil cooler 22 for cooling a hydraulic oil used to drive work implement 4, a radiator 24 for cooling an engine coolant which cools an engine, an aftercooler 25 for cooling compressed air from a turbocharger not shown, a fuel cooler 27 for cooling a fuel supplied to the engine, and a condenser 29 for cooling a cooling medium for the air conditioner.

Oil cooler 22 receives supply of the hydraulic oil from an oil cooler inlet 11, and the cooled hydraulic oil is discharged from an oil cooler outlet 15.

Radiator 24 receives supply of the engine coolant from a radiator inlet hose 14, and the cooled engine coolant is discharged from a radiator outlet hose 19. Radiator 24 is also connected to a reserve tank 21 which stores the engine coolant. In addition, a radiator cap 13 is provided at an upper portion of radiator 24 to allow replenishment of the engine coolant.

Aftercooler 25 receives supply of the compressed air from an aftercooler inlet hose 16, and cools the compressed air. Aftercooler 25 discharges the cooled compressed air from an aftercooler outlet hose 12. Then, the cooled compressed air is supplied to an engine 10.

Fuel cooler 27 receives supply of the fuel from a fuel cooler inlet 26, and the cooled fuel is discharged from a fuel cooler outlet 28.

As shown in FIG. 2(B), a fan 200 is provided on the back side of the cooling unit to cool the cooling unit. Further, fan 200 is coupled to an output shaft of engine 10 and rotated. In addition, a fan cover 17 is provided to cover fan 200.

<Configuration of Fan>

Figure 3:
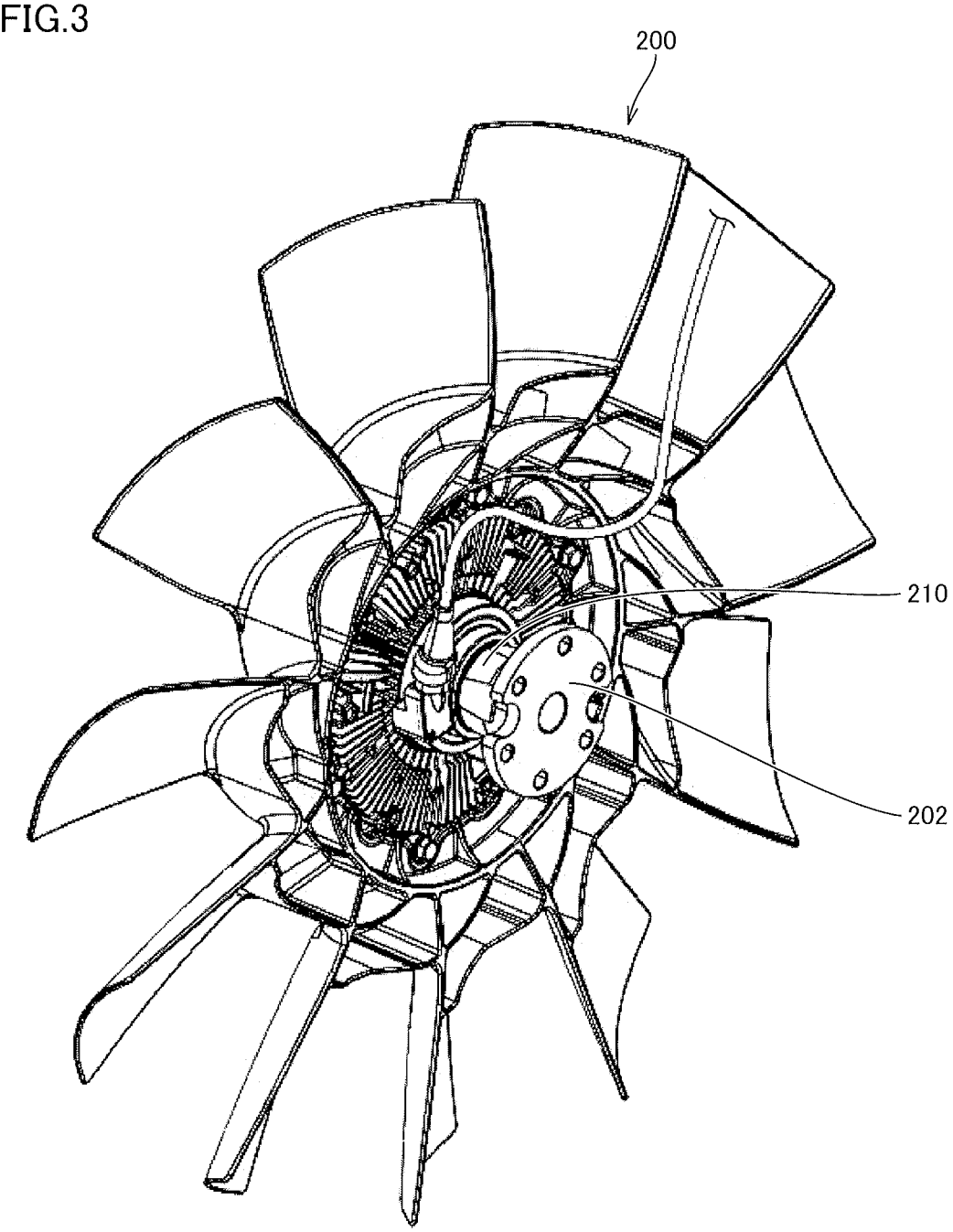
FIG. 3 is a diagram illustrating an appearance of a fan 200 based on the present embodiment.

FIG. 3 is an appearance diagram of fan 200 based on the present embodiment.

Referring to FIG. 3, fan 200 is constituted of 11 blades. A fan drive portion 210 is coupled to an output shaft 202 of engine 10, and controls rotation of fan 200 by means of a fluid clutch.

Figure 4:
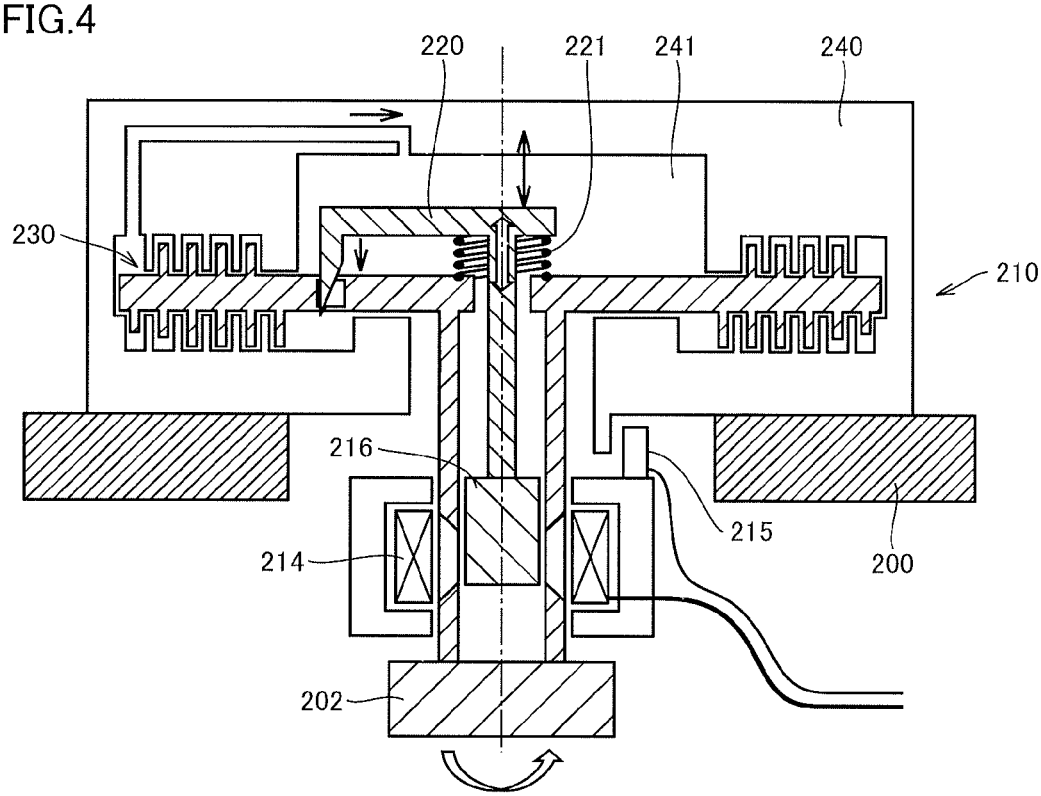
FIG. 4 is a diagram illustrating a configuration of a fan drive portion 210 based on the present embodiment.

FIG. 4 is a diagram illustrating a configuration of fan drive portion 210 based on the present embodiment.

Referring to FIG. 4, fan drive portion 210 includes a case 240, a clutch portion 230, a spring 221, a solenoid movable element 216, a solenoid coil 214, an adjustment member 220, and a hall element 215.

An oil reservoir 241 within case 240 is filled with silicon oil, and rotation of fan 200 is controlled by adjusting the amount of silicon oil to clutch portion 230.

Solenoid movable element 216 is coupled to adjustment member 220. By increasing the amount of current supplied to solenoid coil 214, solenoid movable element 216 compresses spring 221 to push down adjustment member 220. On the other hand, by decreasing the amount of current supplied to solenoid coil 214, a force pushing down solenoid movable element 216 is weakened, and a repulsion force of spring 221 pushes up adjustment member 220.

In accordance with the position of adjustment member 220, the amount of silicon oil which flows from oil reservoir 241 to clutch portion 230 is adjusted. By pushing down adjustment member 220, the amount of silicon oil which flows into clutch portion 230 decreases. On the other hand, by pushing up adjustment member 220, the amount of silicon oil which flows into clutch portion 230 increases.

With a change in the amount of silicon oil, shear resistance changes and the number of rotations of fan 200 changes. With an increase in the amount of silicon oil which flows into clutch portion 230, shear resistance increases and the number of rotations of fan 200 increases. On the other hand, with a decrease in the amount of silicon oil which flows into clutch portion 230, shear resistance lowers and the number of rotations of fan 200 decreases.

Hall element 215 detects the number of rotations of fan 200 and outputs a detection result to a fan controller which will be described later. The fan controller controls the amount of current supplied to solenoid coil 214 such that the number of rotations of fan 200 detected by hall element 215 attains a desired number of rotations.

Although the case where fan drive portion 210 employs a scheme for adjusting the number of rotations of fan 200 by means of a fluid clutch using silicon oil has been described, the scheme employed by fan drive portion 210 is not particularly limited thereto, and fan drive portion 210 may employ such a scheme as an electromagnetic clutch to adjust the number of rotations of fan 200.

<Configuration of Air Conditioner>

Figure 5:
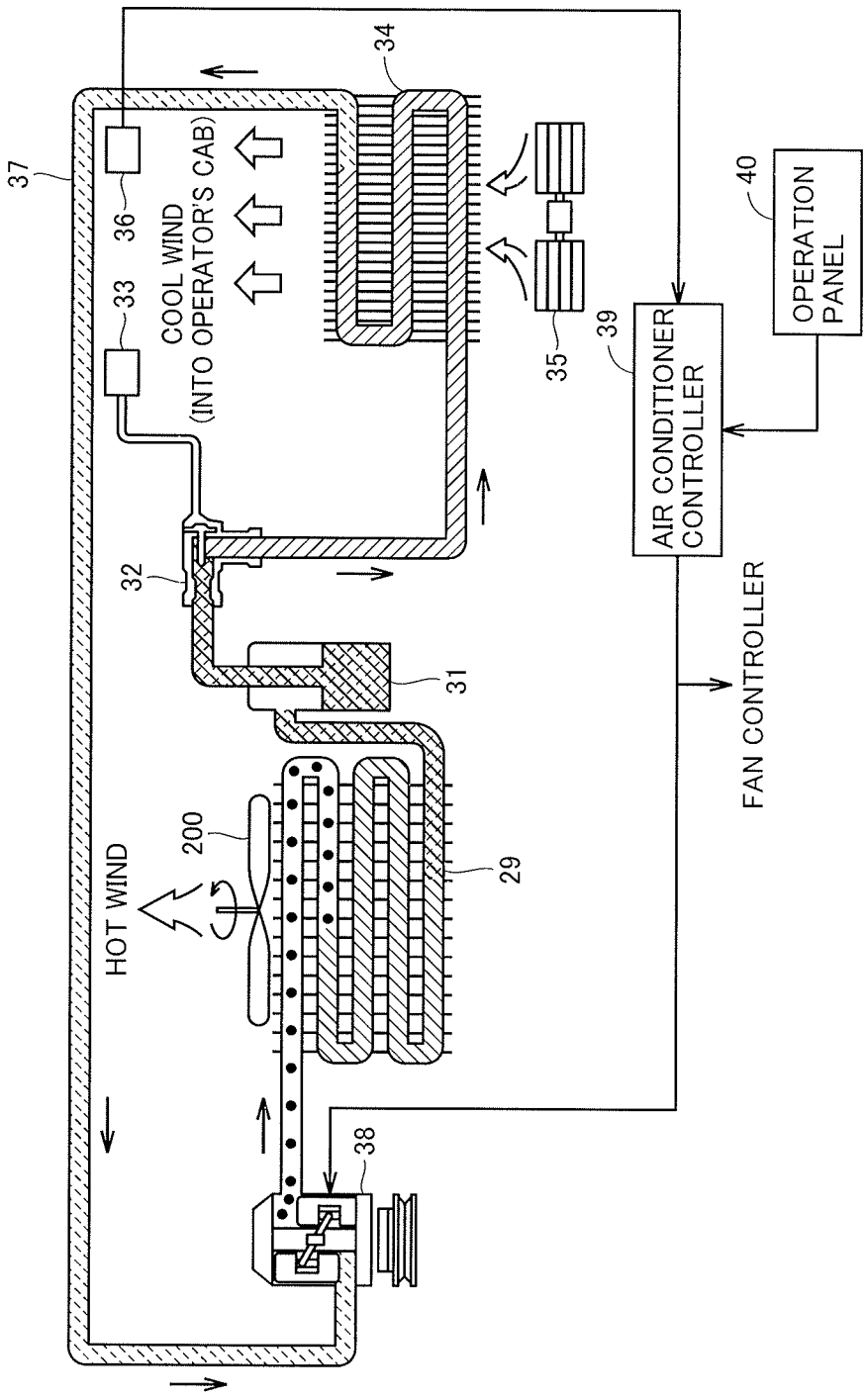
FIG. 5 is a simplified diagram showing a configuration of an air conditioner 30 based on the embodiment.

FIG. 5 is a simplified diagram showing a configuration of an air conditioner 30 based on the embodiment.

As shown in FIG. 5, air conditioner 30 of work vehicle 101 includes condenser 29, a receiver drier 31, an expansion valve 32, a temperature sensing rod 33, an evaporator 34, a blower fan 35, an indoor sensor 36, a circulation path 37 through which the cooling medium circulates, a compressor 38, and an air conditioner controller 39. FIG. 5 shows a case where an operation panel 40 for giving instructions to air conditioner controller 39 and fan 200 for cooling condenser 29 are provided.

Compressor 38 compresses the cooling medium using a drive force of the engine to obtain a high-temperature and high-pressure gaseous cooling medium. Compressor 38 is controlled by air conditioner controller 39, and operates in accordance with an ON/OFF drive signal from air conditioner controller 39.

The high-temperature and high-pressure gaseous cooling medium compressed by compressor 38 is output to condenser 29.

In condenser 29, the gaseous cooling medium is cooled by fan 200 to become a liquid cooling medium.

Receiver drier 31 removes moisture.

Expansion valve 32 adjusts a flow rate by means of a throttle function based on a result detected by temperature sensing rod 33, and lowers the pressure of the liquid cooling medium to a pressure at which it is evaporable.

Evaporator 34 evaporates the liquid cooling medium, and thereby absorbs heat from air around the evaporator and cools the air.

Blower fan 35 blows the air cooled by evaporator 34 into cab 8 to decrease the temperature within cab 8.

Indoor sensor 36 is provided in operator's cab 8 to detect the temperature of air within operator's cab 8 and output it to air conditioner controller 39.

Further, operation panel 40 is provided to allow setting of the temperature of the air within operator's cab 8, and an operator can adjust the temperature of the air within operator's cab 8 through operation panel 40.

Air conditioner controller 39 outputs the ON/OFF drive signal for driving compressor 38 based on the temperature from indoor sensor 36 and the temperature set through operation panel 40. Specifically, when the temperature of the air within operator's cab 8 detected by indoor sensor 36 is higher than the temperature set through operation panel 40, air conditioner controller 39 outputs, to compressor 38, the ON/OFF drive signal in an ON state. On the other hand, when the temperature of the air within operator's cab 8 detected by indoor sensor 36 is lower than or equal to the temperature set through operation panel 40, air conditioner controller 39 outputs, to compressor 38, the ON/OFF drive signal in an OFF state. By the above processing, the air within operator's cab 8 can be cooled and maintained at the set temperature.

Further, the ON/OFF drive signal is also output to a fan controller 126 (FIG. 6) which controls fan 200.

It is noted that engine 10, condenser 29, fan 200, fan drive portion 210, fan controller 126, a memory 125, and compressor 38 represent examples of the "engine", the "condenser", the "fan", the "variable mechanism", the "fan control unit", the "storage unit", and the "compressor" of the present invention, respectively.

<Fan Control System>

Figure 6:
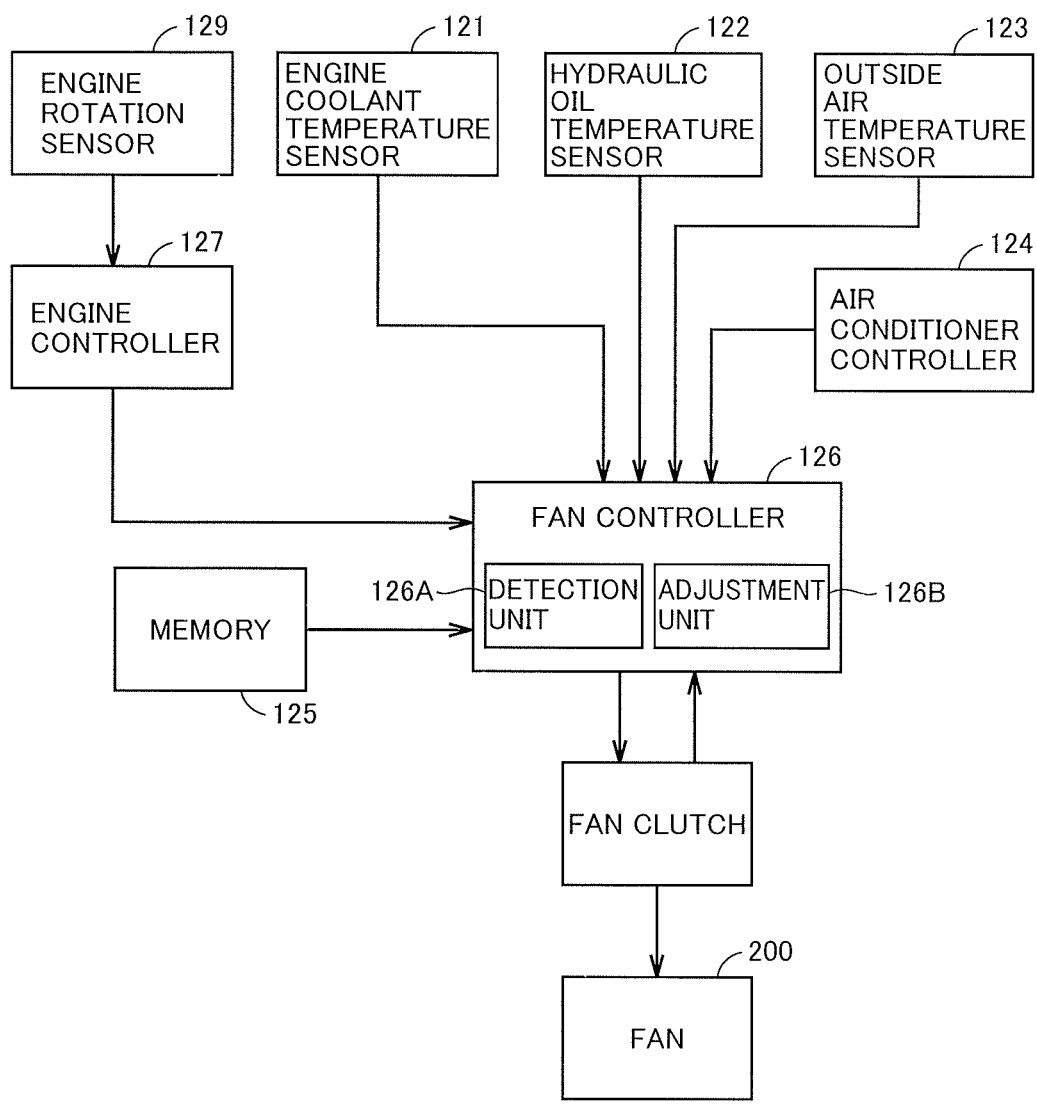
FIG. 6 is a functional block diagram for controlling fan 200 based on the embodiment.

FIG. 6 is a functional block diagram for controlling fan 200 based on the embodiment.

Referring to FIG. 6, a fan control system includes an engine coolant temperature sensor 121 for detecting the temperature of the engine coolant, a hydraulic oil temperature sensor 122 for detecting the temperature of the hydraulic oil, an outside air temperature sensor 123 for detecting an outside air temperature, air conditioner controller 39, memory 125, fan controller 126, an engine controller 127, an engine rotation sensor 129, fan drive portion 210, fan 200, and memory 125.

Fan controller 126 obtains the number of rotations of the engine detected by engine rotation sensor 129, through engine controller 127.

Fan controller 126 obtains the temperature of the engine coolant detected by engine coolant temperature sensor 121.

Fan controller 126 obtains the temperature of the hydraulic oil detected by hydraulic oil temperature sensor 122.

Fan controller 126 obtains the temperature of outside air detected by outside air temperature sensor 123.

Fan controller 126 obtains the ON/OFF drive signal from air conditioner controller 39.

Fan controller 126 includes a detection unit 126A for detecting the state of the air conditioner in accordance with the ON/OFF drive signal from air conditioner controller 39, and an adjustment unit 126B for adjusting the number of rotations of fan 200 by controlling fan drive portion 210.

Adjustment unit 126B sets a target number of rotations of fan 200 based on various information stored in memory 125, and controls fan drive portion 210 to rotate fan 200 at the set target number of rotations.

Memory 125 stores a plurality of control maps for allowing fan controller 126 to set the number of rotations of fan 200 to the target number of rotations of fan 200.

It is noted that outside air temperature sensor 123 represents an example of the "outside air temperature sensor" of the present invention.

The present embodiment will describe a case where the number of rotations of fan 200 is controlled to cool condenser 29 as a cooling object, using for example outside air temperature control maps A, B stored in memory 125, of the control maps described above.

Figure 7:
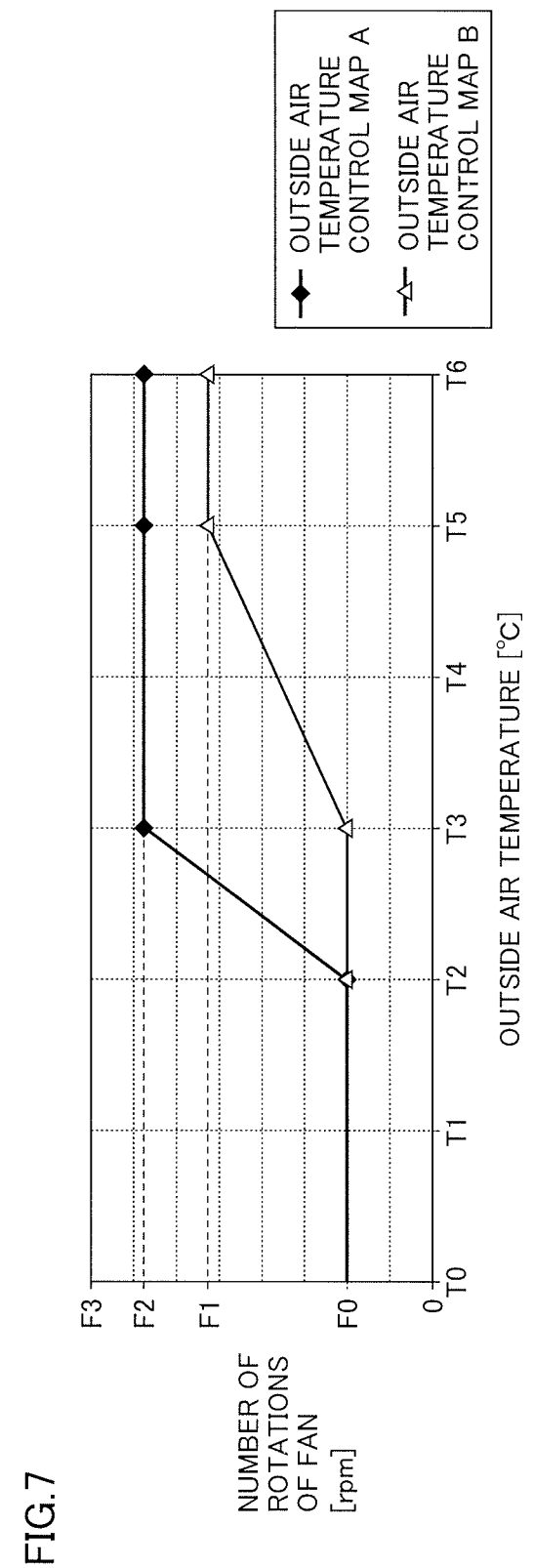
FIG. 7 is a conceptual diagram for setting the number of rotations of fan 200 using outside air temperature control maps A, B in a fan controller 126 based on the embodiment.

FIG. 7 is a conceptual diagram for setting the number of rotations of fan 200 using outside air temperature control maps A, B in fan controller 126 based on the embodiment.

As shown in FIG. 7, when comparison is made between outside air temperature control map A and outside air temperature control map B, the number of rotations of fan 200 increases from an outside air temperature T2° C. in outside air temperature control map A, whereas the number of rotations of fan 200 increases from an outside air temperature T3° C. (T3>T2) in outside air temperature control map B. Therefore, in outside air temperature control map A, the number of rotations of the fan starts increasing at an outside air temperature lower than that in outside air temperature control map B.

Further, in outside air temperature control map A, when the outside air temperature changes from T2° C. to T3° C., the number of rotations of fan 200 increases to the number of rotations F2 of the fan. In outside air temperature control map B, when the outside air temperature changes from T3° C. to T5° C., the number of rotations of fan 200 increases to the number of rotations F1 (<F2) of the fan.

Therefore, a change rate at which the number of rotations of fan 200 increases in outside air temperature control map A is larger than a change rate at which the number of rotations of fan 200 increases in temperature control map B.

In the present embodiment, the number of rotations of fan 200 is controlled by switching between outside air temperature control maps A, B in accordance with an operating state of air conditioner 30 to cool condenser 29.

Specifically, outside air temperature control maps A, B are switched based on the ON/OFF drive signal for compressor 38 indicating the operating state of the air conditioner.

Figure 8:
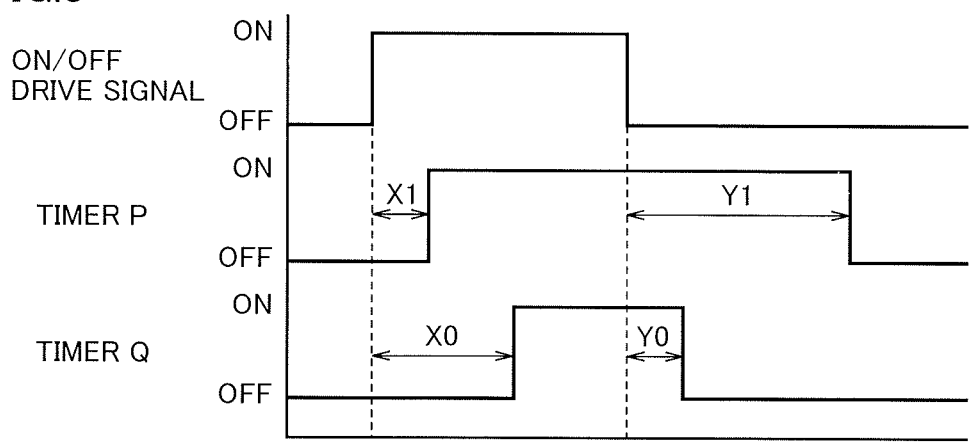
FIG. 8 is a diagram illustrating an ON/OFF drive signal for a compressor 38 and timers P, Q for switching between outside air temperature control maps A, B.

FIG. 8 is a diagram illustrating the ON/OFF drive signal for compressor 38 and timers P, Q for switching between outside air temperature control maps A, B.

Detection unit 126A of fan controller 126 detects the state of the air conditioner based on the ON/OFF drive signal for the compressor and timers P, Q. Then, adjustment unit 126B adjusts the number of rotations of fan 200 based on a detection result.

Referring to FIG. 8, timer P is a determination timer for enabling/disabling outside air temperature control map B.

Timer Q is a determination timer for enabling/disabling outside air temperature control map A.

It is noted that, when both of outside air temperature control maps A, B are enabled, outside air temperature control map A is given priority.

Processing using these determination timers is performed in detection unit 126A of fan controller 126.

Detection unit 126A uses timer P to determine whether or not the ON/OFF drive signal for compressor 38 maintains an ON state for a period X1 (<a period X0) after the signal enters the ON state. When detection unit 126A determines that the ON/OFF drive signal maintains the ON state for period X1, detection unit 126A sets outside air temperature control map B to be enabled. Thereby, adjustment unit 126B starts fan control using outside air temperature control map B.

Further, detection unit 126A uses timer P to determine whether or not the ON/OFF drive signal for compressor 38 maintains an OFF state for a period Y1 (>a period Y0) after the signal enters the OFF state. When detection unit 126A determines that the ON/OFF drive signal maintains the OFF state for period Y1, detection unit 126A sets outside air temperature control map B to be disabled. Thereby, adjustment unit 126B stops the fan control using outside air temperature control map B.

Detection unit 126A uses timer Q to determine whether or not the ON/OFF drive signal for compressor 38 maintains the ON state for period X0 (>period X1) after the signal enters the ON state. Detection unit 126A determines whether or not the state of the air conditioner is in a situation where a heavy load is imposed on the air conditioner. When detection unit 126A determines that the ON/OFF drive signal maintains the ON state for period X0, detection unit 126A determines that a heavy load is imposed on the air conditioner, and sets outside air temperature control map A to be enabled. Thereby, adjustment unit 126B starts fan control using outside air temperature control map A. When both of outside air temperature control maps A, B are enabled, adjustment unit 126B gives priority to outside air temperature control map A.

Further, detection unit 126A uses timer Q to determine whether or not the ON/OFF drive signal for compressor 38 maintains the OFF state for period Y0 after the signal enters the OFF state. When detection unit 126A determines that the ON/OFF drive signal maintains the OFF state for period Y0, detection unit 126A sets outside air temperature control map A to be disabled. Thereby, adjustment unit 126B stops the fan control using outside air temperature control map A. In this case, when outside air temperature control map B is enabled, adjustment unit 126B switches fan control to the fan control using outside air temperature control map B.

Figure 9:
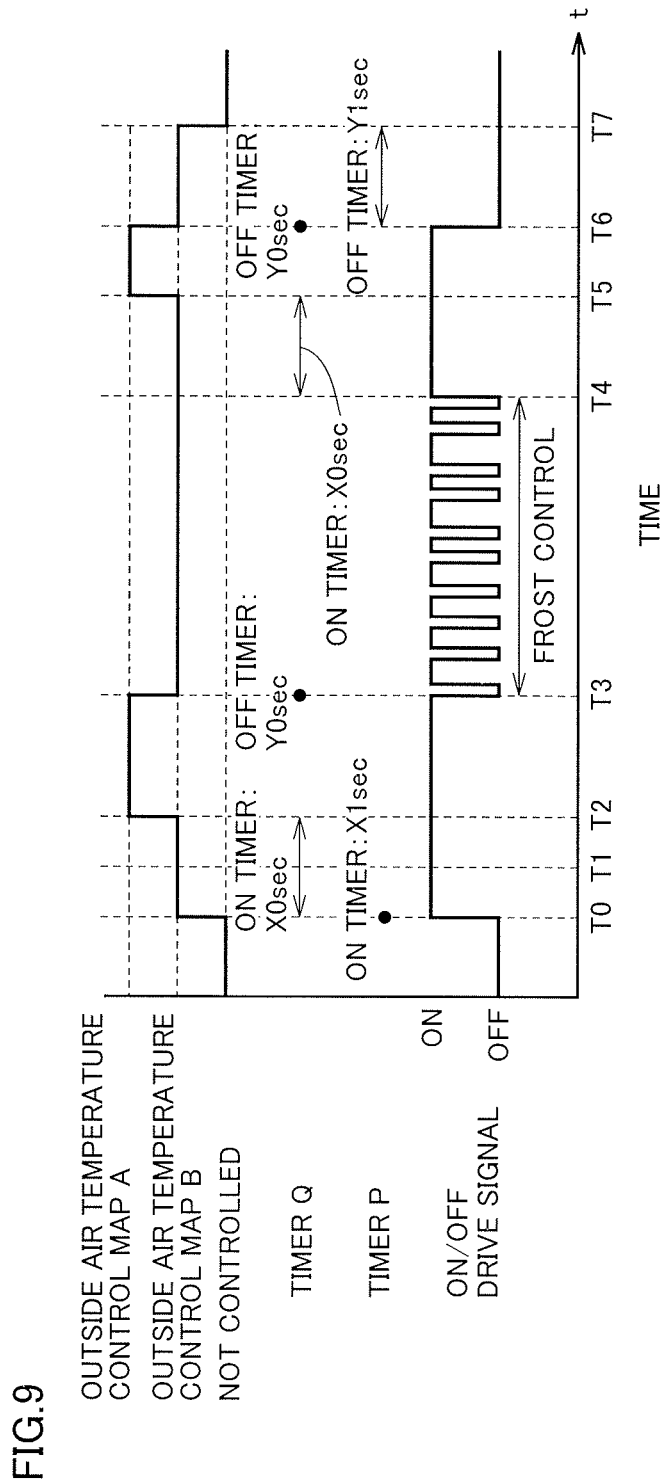
FIG. 9 is a diagram illustrating a specific example of changing the outside air temperature control maps in accordance with the ON/OFF drive signal for compressor 38.

FIG. 9 is a diagram illustrating a specific example of changing the outside air temperature control maps in accordance with the ON/OFF drive signal for compressor 38.

As shown in FIG. 9, first, at a time T0, the ON/OFF drive signal for compressor 38 shifts from an OFF state to an ON state.

Detection unit 126A detects the shift, and uses timer P to determine whether or not the ON state of the ON/OFF drive signal for compressor 38 continues for period X1. Based on a determination result, detection unit 126A sets outside air temperature control map B stored in memory 125 to be enabled. Then, adjustment unit 126B starts the fan control using outside air temperature control map B.

Next, at a time T2, detection unit 126A uses timer Q to determine whether or not the ON state of the ON/OFF drive signal for compressor 38 continues for period X0. Based on a determination result, detection unit 126A sets outside air temperature control map A stored in memory 125 to be enabled. When both of outside air temperature control maps A, B are enabled, adjustment unit 126B gives priority to outside air temperature control map A, and performs the fan control using outside air temperature control map A.

Next, at a time T3, the ON/OFF drive signal for compressor 38 shifts from the ON state to an OFF state.

Detection unit 126A detects the state, and uses timer Q to determine whether or not the OFF state of the ON/OFF drive signal for compressor 38 continues for period Y0. Based on a determination result, detection unit 126A sets outside air temperature control map A stored in memory 125 to be disabled. Then, adjustment unit 126B starts the fan control using outside air temperature control map B.

From time T3 to a time T4, frost control is performed in which the ON/OFF drive signal for compressor 38 repeatedly enters an ON state or an OFF state. During the frost control, the fan control using outside air temperature control map B is performed. The reason why outside air temperature control map B is enabled when the ON/OFF drive signal for compressor 38 repeatedly enters an ON state or an OFF state is that period Y1 of timer P is longer than a period for which an OFF state of the ON/OFF drive signal continues during the frost control.

Next, at a time T5, detection unit 126A uses timer Q to determine whether or not the ON state of the ON/OFF drive signal for compressor 38 continues for period X0. Based on a determination result, detection unit 126A sets outside air temperature control map A stored in memory 125 to be enabled. When both of outside air temperature control maps A, B are enabled, adjustment unit 126B gives priority to outside air temperature control map A, and performs the fan control using outside air temperature control map A.

Next, at a time T6, the ON/OFF drive signal for compressor 38 shifts from the ON state to an OFF state.

Detection unit 126A detects the state, and uses timer Q to determine whether or not the OFF state of the ON/OFF drive signal for compressor 38 continues for period Y0. Based on a determination result, detection unit 126A sets outside air temperature control map A stored in memory 125 to be disabled. Then, adjustment unit 126B starts the fan control using outside air temperature control map B.

Next, at a time T7, detection unit 126A uses timer P to determine whether or not the OFF state of the ON/OFF drive signal for compressor 38 continues for period Y1. Based on a determination result, detection unit 126A sets outside air temperature control map B stored in memory 125 to be disabled. Then, adjustment unit 126B finishes the fan control using outside air temperature control map B.

By the above processing, when the ON state of the ON/OFF drive signal for compressor 38 is detected and the ON state continues for period X0, outside air temperature control map A of the plurality of control maps is enabled, and the number of rotations of fan 200 is controlled using outside air temperature control map A. Therefore, in a situation where a heavy load is imposed on the air conditioner, the speed of cooling the air in operator's cab 8 can be increased by increasing the number of rotations of fan 200 at an early point and enhancing cooling of condenser 29.

On the other hand, when the ON/OFF drive signal for compressor 38 is intermittently in an ON state for a period shorter than period X0, outside air temperature control map B of the plurality of control maps is enabled, and the number of rotations of the fan is controlled using outside air temperature control map B. Therefore, in a situation where a load imposed on the air conditioner is not a heavy load, the number of rotations of fan 200 can be efficiently controlled by selectively setting the number of rotations of the fan to a low number of rotations. In particular, fuel efficiency can be improved by suppressing the number of rotations of fan 200 driven by engine 10.

Although the fan controls using outside air temperature control maps A, B have been described above, fan 200 can also be controlled using a further plurality of control maps.

FIG. 10 is a conceptual diagram for controlling fan 200 using a plurality of control maps.

This processing is performed in detection unit 126A and adjustment unit 126B of fan controller 126.

As shown in FIG. 10, adjustment unit 126B sets the number of rotations of the fan with reference to an engine coolant temperature control map stored in memory 125 in accordance with the temperature of the engine coolant detected by engine coolant temperature sensor 121. The engine coolant temperature control map is a control map for setting the number of rotations of fan 200 in accordance with the temperature of the engine coolant to cool radiator 24 of the cooling unit as a cooling object.

Adjustment unit 126B sets the number of rotations of the fan with reference to a hydraulic oil temperature control map stored in memory 125 in accordance with the temperature of the hydraulic oil detected by hydraulic oil temperature sensor 122. The hydraulic oil temperature control map is a control map for setting the number of rotations of fan 200 in accordance with the temperature of the hydraulic oil to cool oil cooler 22 of the cooling unit as a cooling object.

As described above, detection unit 126A detects the state of the air conditioner, and sets an outside air temperature control map. Then, adjustment unit 126B sets the number of rotations of the fan with reference to the outside air temperature control map set by detection unit 126A stored in memory 125 in accordance with the outside air temperature detected by outside air temperature sensor 123.

Subsequently, adjustment unit 126B selects the highest number of rotations, from among the number of rotations of the fan set with reference to the engine coolant temperature control map, the number of rotations of the fan set with reference to the hydraulic oil temperature control map, and the number of rotations of the fan set with reference to the outside air temperature control map.

The highest number of rotations of the fan required for cooling is selected for each cooling object of the cooling unit (i.e., selection of high rotation).

In addition, adjustment unit 126B sets the number of rotations of the fan with reference to a control map for the number of rotations of the engine stored in memory 125 in accordance with the number of rotations of the engine detected by engine rotation sensor 129. The control map for the number of rotations of the engine is a control map for setting the number of rotations of fan 200 via fan drive portion 210 in accordance with the number of rotations of engine 10.

Subsequently, adjustment unit 126B selects a lower number of rotations of the fan, from among the number of rotations of the fan set with reference to the control map for the number of rotations of the engine and the highest number of rotations of the fan described above (i.e., selection of low rotation).

Fan 200 is coupled to the output shaft of engine 10 via fan drive portion 210, and is rotated by means of the drive force of engine 10. Accordingly, the number of rotations of the fan set in accordance with the control map for the number of rotations of the engine is the maximum number of rotations of the fan which can be rotated by driving the engine. Therefore, when the selected highest number of rotations of the fan (i.e., selection of high rotation) is larger than the number of rotations of the fan set in accordance with the control map for the number of rotations of the engine, the number of rotations of the fan is set to the maximum number of rotations of the fan set in accordance with the control map for the number of rotations of the engine. Fan 200 can be rotated at the number of rotations of the fan with the maximum output.

On the other hand, when the selected highest number of rotations of the fan (i.e., selection of high rotation) is smaller than or equal to the number of rotations of the fan set in accordance with the control map for the number of rotations of the engine, the number of rotations of the fan is set to the selected highest number of rotations of the fan (i.e., selection of high rotation). Fan 200 can be efficiently rotated without being rotated at an excessive number of rotations of the fan.

By the scheme described above, the number of rotations of the fan can be appropriately adjusted based on the plurality of control maps, also in consideration of the state of other cooling objects.

<Others>

Although a hydraulic excavator has been described by way of example as a work vehicle in the present example, the present invention is also applicable to a work vehicle such as a bulldozer or a wheel loader.

Although the embodiment of the present invention has been described above, it should be understood that the embodiment disclosed herein is illustrative and non-restrictive in every respect. The scope of the present invention is defined by the scope of the claims, and is intended to include any modifications within the scope and meaning equivalent to the scope of the claims.

REFERENCE SIGNS LIST

1: lower carrier; 3: upper revolving unit; 4: work implement; 5: boom; 6: arm; 7: bucket; 8: operator's cab; 10: engine; 11: oil cooler inlet; 12: aftercooler outlet hose; 13: radiator cap; 14: radiator inlet hose; 15: oil cooler outlet; 16: aftercooler inlet hose; 17: fan cover; 19: radiator outlet hose; 21: reserve tank; 22: oil cooler; 24: radiator; 25: aftercooler; 26: fuel cooler inlet; 27: fuel cooler; 28: fuel cooler outlet; 29: condenser; 30: air conditioner; 31: receiver drier; 32: expansion valve; 33: temperature sensing rod; 34: evaporator; 35: blower fan; 36: indoor sensor; 37: circulation path; 38: compressor; 39: air conditioner controller; 40: operation panel; 101: work vehicle; 121: engine coolant temperature sensor; 122: hydraulic oil temperature sensor; 123: outside air temperature sensor; 125: memory; 126: fan controller; 126A: detection unit; 126B: adjustment unit; 127: engine controller; 129: engine rotation sensor; 200: fan; 202: output shaft; 210: fan drive portion; 214: solenoid coil; 215: hall element; 216: solenoid movable element; 220: adjustment member; 221: spring; 230: clutch portion; 240: case.

The invention claimed is:

1. A work vehicle, comprising:
a condenser for cooling a cooling medium used in an air conditioner;
a compressor for compressing said cooling medium for said air conditioner;
a fan for cooling said condenser;
a variable mechanism capable of changing a number of rotations of said fan;
a fan control unit for controlling said variable mechanism;
an outside air temperature sensor for detecting an outside air temperature; and
a storage unit for storing a plurality of control maps for setting the number of rotations of the fan to respective different numbers of rotations of the fan in accordance with the outside air temperature detected by said outside air temperature sensor,
wherein said fan control unit controls said variable mechanism in accordance with one control map selected from said plurality of control maps stored in said storage unit based on an operating state of said air conditioner, to control the number of rotations of said fan,
wherein said fan control unit determines the operating state of said air conditioner by detecting a state of an ON/OFF drive signal which controls an ON/OFF operation of said compressor, and
said fan control unit controls said variable mechanism in accordance with said ON/OFF drive signal.

2. The work vehicle according to claim 1, wherein, in one control map of said plurality of control maps, the number of rotations of said fan starts increasing at an outside air temperature lower than that in another control map.

3. The work vehicle according to claim 2, wherein
when said fan control unit detects that an ON Operation by said ON/OFF drive signal continues for first period, said fan control unit controls said variable mechanism in accordance with said other control map of said plurality of control maps, and
when said fan control unit detects that the ON operation by said ON/OFF drive signal continues for a second period longer than said first period, said fan control unit controls said variable mechanism in accordance with said one control map of said plurality of control maps.

4. The work vehicle according to claim 3, wherein
in a case where said fan control unit controls said variable mechanism in accordance with said one control map of said plurality of control maps,
when said fan control unit detects that an OFF operation by said ON/OFF drive signal continues for a third period, said fan control unit controls said variable mechanism in accordance with said other control map of said plurality of control maps, and
when said fan control unit detects that the OFF operation by said ON/OFF drive signal continues for a fourth period longer than said third period, said fan control unit stops control of said variable mechanism in accordance with said other control map of said plurality of control maps.

5. The work vehicle according to claim 1, wherein, in one control map of said plurality of control maps, a change rate of the number of rotations of the fan with respect to said outside air temperature is larger than that in another control map.

6. The work vehicle according to claim 1, further comprising an engine for supplying a drive force for rotation to said fan,
wherein said variable mechanism is provided between said engine and said fan, and can change the number of rotations of said fan with respect to a number of rotations of said engine.

7. The work vehicle according to claim 6, wherein
said fan further cools at least one of an engine coolant for cooling said engine and a hydraulic oil used in a work implement,
said storage unit further stores at least one of an engine coolant temperature control map for setting the number of rotations of said fan in accordance with a temperature of said engine coolant and a hydraulic oil temperature control map for setting the number of rotations of said fan in accordance with a temperature of said hydraulic oil, and
said fan control unit controls said variable mechanism based on said selected control map and at least one of said engine coolant temperature control map and said hydraulic oil temperature control map, to control the number of rotations of said fan.

* * * * *